2,842,578

POLYCHLOROBENZENEDITHIOLS

Josef Pikl, Glassboro, N. J., assignor to E. I. du Pont de Nemours and Company, Wilmington, Del., a corporation of Delaware No Drawing. Application April 23, 1954
Serial No. 425,301

3 Claims. (Cl. 260—429.9)

This invention relates to new organic compounds, and more particularly to tetrachlorobenzenedithiols and a process of their manufacture.

This is a continuation-in-part of my co-pending application Serial No. 346,020, filed March 31, 1953. In this co-pending application a new method is described for the manufacture of aromatic mercaptans from polychlorobenzenes containing from 4 to 6 chlorine atoms, and the use of such chlorine-containing benzenethiols as peptizing agents in elastomers. These compounds are also described as intermediates for the preparation of other chemicals. In the manufacture of the chlorobenzenethiols, the polychlorobenzenes are reacted with the alkali metal sulfhydrate in an organic solvent in which both the reactants are soluble, while heating to temperatures of from 100° to 170° C. It is pointed out that by increasing the amount of the alkali metal polysulfides present in the sulfhydrate, an increased amount of the dithiols are produced. Isolation of isomeric tetrachlorobenzenedithiols from the monothiophenols is described and their chemical analysis is given.

It is an object of the present invention to provide a new and improved process for the manufacture of tetrachlorobenzenedithiols and their zinc salts. It is a further object of the invention to produce a new tetrachlorobenzenedithiol-iron complex which may be used as the starting intermediate for the preparation of the tetrachlorobenzenedithiols.

According to the present process, the tetrachlorobenzenedithiol-iron complex is prepared by reacting hexachlorobenzene in methanol with an alkali metal sulfhydrate in the presence of iron or an iron salt at temperatures of about 130° to 170° C. The reaction mixture is then treated with dilute caustic and the iron complex filtered off. This tetrachlorobenzenedithiol-iron complex is readily converted to the free dithiol by treatment with sodium zincate (prepared from caustic soda and zinc oxide). The resulting iron oxide is filtered off from the solution and the sodium salt of the dithiol is converted to the free dithiol by treatment with acid. Alternatively, the iron complex may be converted to the free dithiol by refluxing in a 10% by weight solution of alcoholic hydrochloric acid. The treatment with the sodium zincate, however, is preferred.

In the preparation of the iron complex, it is necessary to maintain the molar ratio of the alkali metal sulfhydrate to the hexachlorobenzene at about 2:1 to 5:1, preferably at a molar ratio of about 3.5:1. As pointed out in my co-pending application Serial No. 346,020 more particularly directed to the preparation of the monothiols, when the alkali metal sulfhydrate-hexachlorobenzene ratio is decreased, compounds containing a higher percentage of sulfur are preferentially formed. In order to ensure satisfactory yields of the dithiol without the formation of monothiols, the excess alkali metal sulfhydrate should not exceed the ratio given above.

The presence of sulfur in the reaction mass also ensures that the dithiol complex will be formed in reasonably good yield. This was also referred to in my copending application above mentioned, for in the preparation of the monothiols the presence of the alkali metal polysulfides was held to a minimum. When sulfur is added to the alkali metal sulfhydrate solution, polysulfides are formed, thus enhancing the formation of the tetrachlorobenzenedithiol-iron complex. Where the sulfhydrate already contains a substantial amount of the alkali metal polysulfides, further addition of sulfur is not necessary. Although the sodium, potassium or ammonium sulfhydrates may be employed, the sodium sulfhydrate is preferred since it is commercially available and operates satisfactorily in the process.

While, as pointed out above, the reaction may be carried out at temperatures of from 130° to 170° C., the process is preferably carried out at temperatures of about 150° C. When temperatures materially below 130° C. are employed an excessive reaction time is required, which makes the process uneconomical. While the reaction proceeds readily at temperatures above 170° C., no particular advantage has been found for operating at the higher temperatures.

The reaction is usually completed when the reaction temperature is maintained at from 4 to 10 hours. Ordinarily the mass is brought to reaction temperature over a period of about 4 hours and is usually completed when maintained at the reaction temperature for an additional 4 to 10 hours.

The formation of the iron complex of the tetrachlorobenzenedithiol is preferably carried out in methanol, although other solvents which serve to bring the alkali metal sulfhydrate and the hexachlorobenzene into intimate contact but which are inert under the conditions of the reaction, may be employed. Other alcohols such as ethyl alcohol, isopropyl alcohol, ethylene glycol, pyridine or similar solvents or mixtures of the same, may be employed.

Either iron in finely divided form or an iron salt may be employed in this reaction. In fact, where the reaction vessel is iron or common steel, the reaction will proceed to a satisfactory degree although of course there will be excessive damage to the equipment. The use of iron salt in the reaction is preferable since it avoids excess equipment damage and results in the reaction being completed in a much shorter time. As an illustration, when a common steel autoclave is employed (without the addition of iron or iron salt), a reaction time of about 8 hours is required to bring the reaction to completion, but when anhydrous ferrous chloride is added the time of the reaction is reduced to about 4 hours.

Either ferrous or ferric salts as their hydrates or in the anhydrous form are operable. Anhydrous ferrous chloride, iron sulfides, sulfates, nitrates, oxalates, acetates and phosphates are all operable. Since the ferric salts are reduced to their lower valence state by the sulfhydrate which to that extent is used up in the reaction, it is more desirable to use the ferrous salts.

The tetrachlorobenzenedithiol-iron complex is believed to be a complex rather than merely an iron salt in view of the fact that this compound contains coordinate bonds, as indicated by its relative stability toward acids. Ordinary salt of this type can be readily converted to the free dithiol with acid, whereas the iron complex requires heating with 10% mineral acid for one-half hour or more. Furthermore, the iron complex shows relatively high solubility in organic solvents and exhibits high tinctorial strength in such solutions. Analysis shows the product to have the general formula:

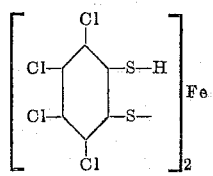

A preferred process for converting the tetrachlorobenzenedithiol-iron complex to the tetrachlorobenzenedithiol itself is to add the hot methanol solution of the complex to the sodium zincate solution. In this way the reaction appears to be almost instantaneous, and after neutralization with acid the free dithiol is isolated in good yield.

The tetrachlorobenzenedithiol isolated in the general procedure described above is a practically colorless yellow compound melting when pure at about 268° C. It shows solubility in the common organic solvents such as benzene, toluene, kerosene and carbon tetrachloride from which it may be crystallized. Kerosene is the preferred solvent. Although the exact chemical structure of this tetrachlorobenzenedithiol has not been fully established, the fact that on its degradation with activated Raney nickel the 1,2,3,4-tetrachlorobenzene is obtained, would indicate that it is the ortho-dithiol. The fact that it has a relatively sharp melting point indicates that it is essentially a pure compound. This product is the same as that obtained in an impure form in Example 8 of my copending application Serial No. 346,020.

The tetrachlorobenzenedithiol may be converted to the zinc salt by treating a caustic solution of the dithiol (that is, a solution of the water soluble sodium salt) with a water soluble zinc salt such as zinc sulfate. On heating this mixture to from 50° to 90° C. for a short time, the ivory-colored solid zinc salt is filtered off. Only one thiol group appears to react with the zinc to form a compound of the following general formula:

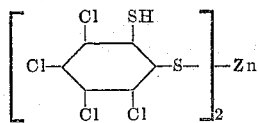

The tetrachlorobenzenedithiol and the zinc salts of this invention are effective plasticizing agents for natural and synthetic rubbers, as disclosed in my copending application Serial No. 346,020, now U. S. Patent 2,765,345 of October 2, 1956. They are also useful as vulcanizing agents for polychloroprene and may be incorporated in this elastomer in the massive state or in the latex form.

The following examples are given to illustrate the invention, in which the parts used are by weight unless otherwise specified.

*Example 1*

A common steel autoclave was charged with 244.8 parts (0.86 mol) of hexachlorobenzene, 206.4 parts (2.57 mols) of sodium sulfhydrate (70% flakes), 0.9 part (0.027 mol) of sulfur and 348 parts (10.85 mols) of methanol. The remaining air in the autoclave was replaced with nitrogen and the mass heated to 145° C. over a period of 4½ hours and held at that temperature for 9 hours. The heat was then lowered to room temperature. The reaction mass was diluted with 33 parts of 30% sodium hydroxide solution and 1100 parts of water. The insoluble material was then filtered off, washed with water and dried at room temperature and then at 85° C.

Ten (10) parts of the crude iron complex of the tetrachlorobenzenedithiol thus obtained were dissolved in 79 parts of acetone and filtered to remove a small amount of insoluble material. The acetone filtrate was diluted with 1060 parts of hot benzene, and after cooling to room temperature the precipitated solid material was filtered off and washed with an acetone-benzene mixture (about 1:10 by volume). Eight (8) grams of solid material thus obtained were recrystallized from a mixture of 210 parts of glacial acetic acid in 300 parts of water, then dried at 100° C., to yield 6 parts of black crystals analyzing as follows: Found: percent C=23.1, 22.8; percent H=0.41, 0.30; percent Cl=43.7, 43.9; percent S=21.2, 21.3; percent Fe=8.58, 8.58.

*Example 2*

A mixture of 272 parts (0.95 mol) of hexachlorobenzene, 28 parts of iron powder, 206 parts (2.57 mols) of sodium sulfhydrate (70% flakes), 1 part (0.03 mol) of sulfur and 388 parts (12.1 mols) of methanol was placed in a stainless steel autoclave and the air replaced with nitrogen. The contents were heated to 145° C. in 4½ hours and held at 145° C. for 8 hours. The mixture was cooled to room temperature and diluted with a mixture of 33 parts of 30% sodium hydroxide and 1100 parts of water, filtered and the cake washed with water. 138.6 parts of a dark colored tetrachlorobenzenedithiol-iron complex was obtained.

*Example 3*

A mixture of 44.4 parts (0.35 mol) of anhydrous ferrous chloride, 199 parts (0.7 mol) of hexachlorobenzene, 208 parts (2.6 mols) of 70% sodium sulfhydrate, 0.7 part of sulfur and 317 parts of methanol was placed in a common steel autoclave. After replacing the air with nitrogen, the mixture was heated to 145° C. in 4½ hours and held at 145° C. for 4 hours longer. On cooling to room temperature the mixture was diluted with 33 parts of 30% caustic and 1100 parts of water. After standing for one-half hour it was filtered and the filter cake was washed with two 200 part portions of water. It was then dried at room temperature and then at 85° C., yielding 196 parts of crude tetrachlorobenzenedithiol-iron complex.

*Example 4*

A solution of 45 parts of zinc oxide in 390 parts of 30% sodium hydroxide was diluted with 600 parts of water, and to this was added at 50° C. 630 parts of methanol containing 138 parts of the iron salt of Example 2 at 50° C. After being heated at 75° C. for one-half hour, the solution was filtered and the filtrate added to a solution of 822 parts of 96% sulfuric acid in 1500 parts of water at from 50° to 60° C. On cooling to room temperature, the yellow precipitate was filtered off, washed acid-free with water, and dried at 100° C. 107.6 parts of the precipitated pale yellow tetrachlorobenzenedithiol was obtained, having a melting point of 248°–251° C. After crystallization from toluene, the product in the form of yellow needles melted at 260°–262° C.

*Example 5*

A solution of 10 parts of zinc oxide, 24 parts of methanol and 40 parts of 30% sodium hydroxide in 150 parts of water was prepared, and 30 parts of the tetrachlorobenzenedithiol-iron complex was added. On warming, the black mixture turned gray and then light brown, the color of ferric hydroxide. The mixture was diluted with water, filtered, and the clear filtrate acidified with hydrochloric acid.

The gray precipitate which resulted from acidification was filtered off, washed free of acid and dried at 100° C., yielding 26 parts of crude tetrachlorobenzenedithiol. This material was recrystallized from carbon tetrachloride to yield a product melting at 262°–264° C. On further recrystallization from dependip (a kerosene fraction), long needles melting at 265°–268° C. were obtained which analyzed for $C_6H_2Cl_4S_2$ as follows. Found/calc.: Percent C=25.8/25.7; percent H=0.78/0.71; percent S=22.7, 23.0/22.8; percent Cl=50.3, 50.0/50.7.

Example 6

To a solution of 2.9 parts of sodium hydroxide in 80 parts of water was added, after the air was replaced in the reaction vessel with nitrogen, 16 parts of tetrachlorobenzenedithiol. The temperature was raised to 70° C. and a solution of 8.2 parts of $ZnSO_4 \cdot 7H_2O$ in 35 parts of water was added over a 45 minute period. After about one-half hour at 70° C., the reaction mixture was filtered and the solid washed with water until free of sulfate ions, and dried at 70° C. The zinc salt was obtained in a yield of 13.2 parts as an ivory-colored solid which analyzed for $C_{12}H_2Cl_8S_4Zn$ as follows: Found/calc.: Percent Cl=45.9/45.4; percent S=20.4/20.5; percent Zn=9.8/10.4.

As indicated above, the formation of the tetrachlorobenzenedithiol-iron complex is brought about by the presence of an iron salt which may be prepared in situ by the addition of iron itself. The alkali metal polysulfides employed in the reaction to increase the yield of the dithiols are usually present in the sulfhydrate. Where they are not present in sufficient amount they may be formed in situ by the addition of sulfur which, together with the sulfhydrate, produces the polysulfides.

I claim:

1. A process for preparing tetrachlorobenzenedithiol which comprises reacting hexachlorobenzene with sodium sulfhydrate in a molar ratio of from 2:1 to 5:1 in the presence of a simple iron salt at temperatures of from 130° to 170° C. and in the presence of sodium polysulfides to first form the tetrachlorobenzenedithiol-iron complex, heating the resulting tetrachlorobenzenedithiol-iron complex with sodium zincate, filtering off the solution of the sodium salt of the tetrachlorobenzenedithiol, and acidifying the solution to precipitate the tetrachlorobenzenedithiol.
2. Tetrachlorobenzenedithiol.
3. The zinc salt of tetrachlorobenzenedithiol.

References Cited in the file of this patent

UNITED STATES PATENTS

| | | |
|---|---|---|
| 1,825,662 | Hale | Oct. 6, 1931 |
| 2,413,531 | Verbane | Dec. 31, 1946 |
| 2,454,260 | Steiger | Nov. 16, 1948 |